July 20, 1943.   R. R. FREDERICK ET AL   2,324,572
MEANS AND METHOD FOR SECURING ENDS TO TUBES
Filed May 12, 1941   7 Sheets-Sheet 1

Inventors.
ROBERT R. FREDERICK
ADOLPH W. AWOT

By Albert Sperry.
Attorney.

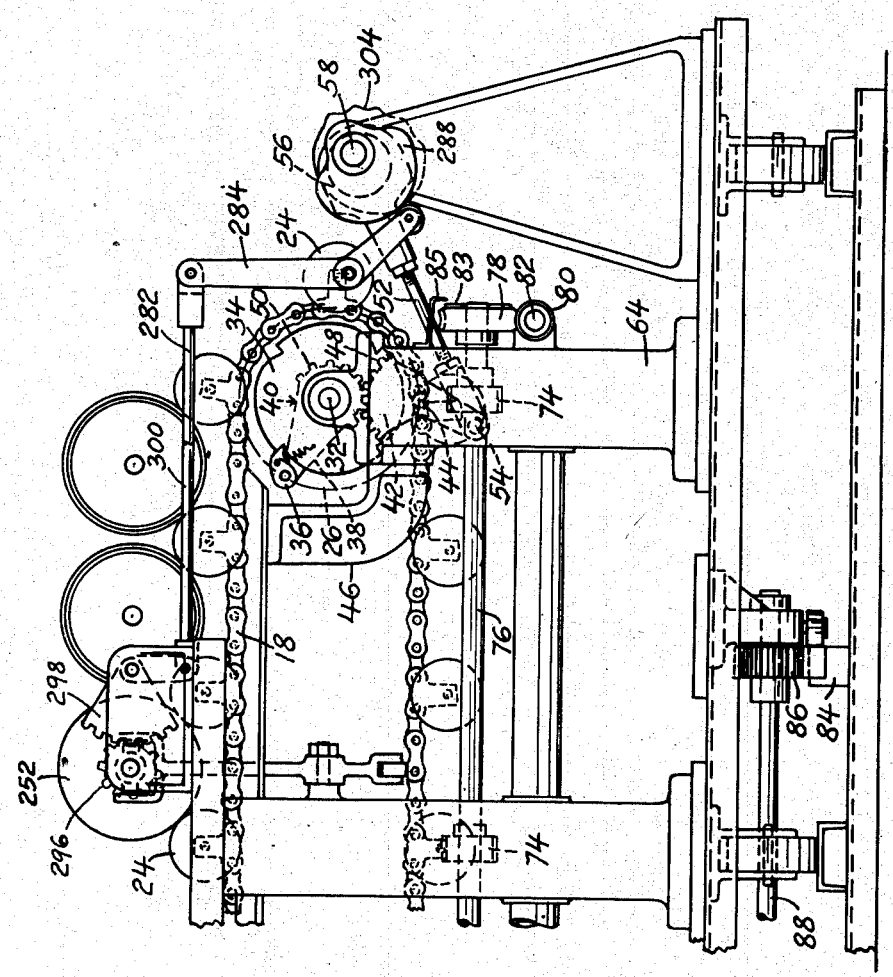
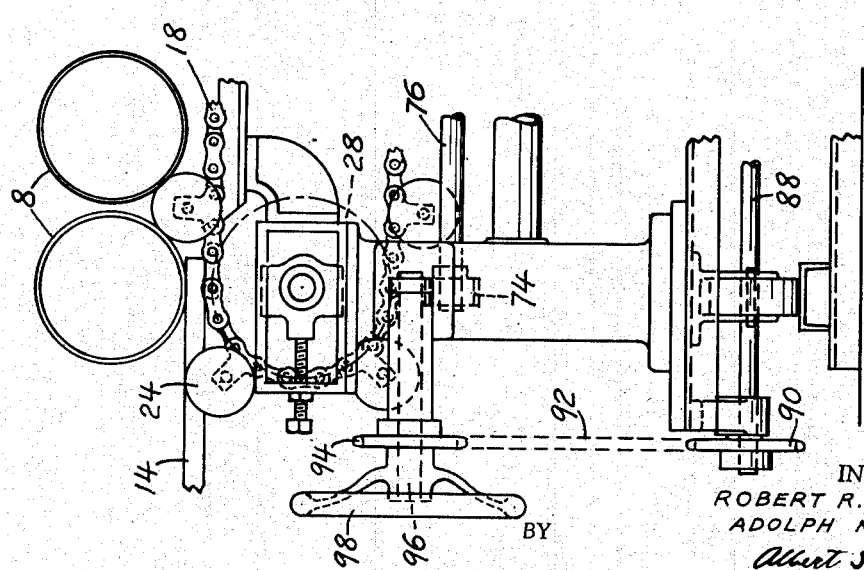

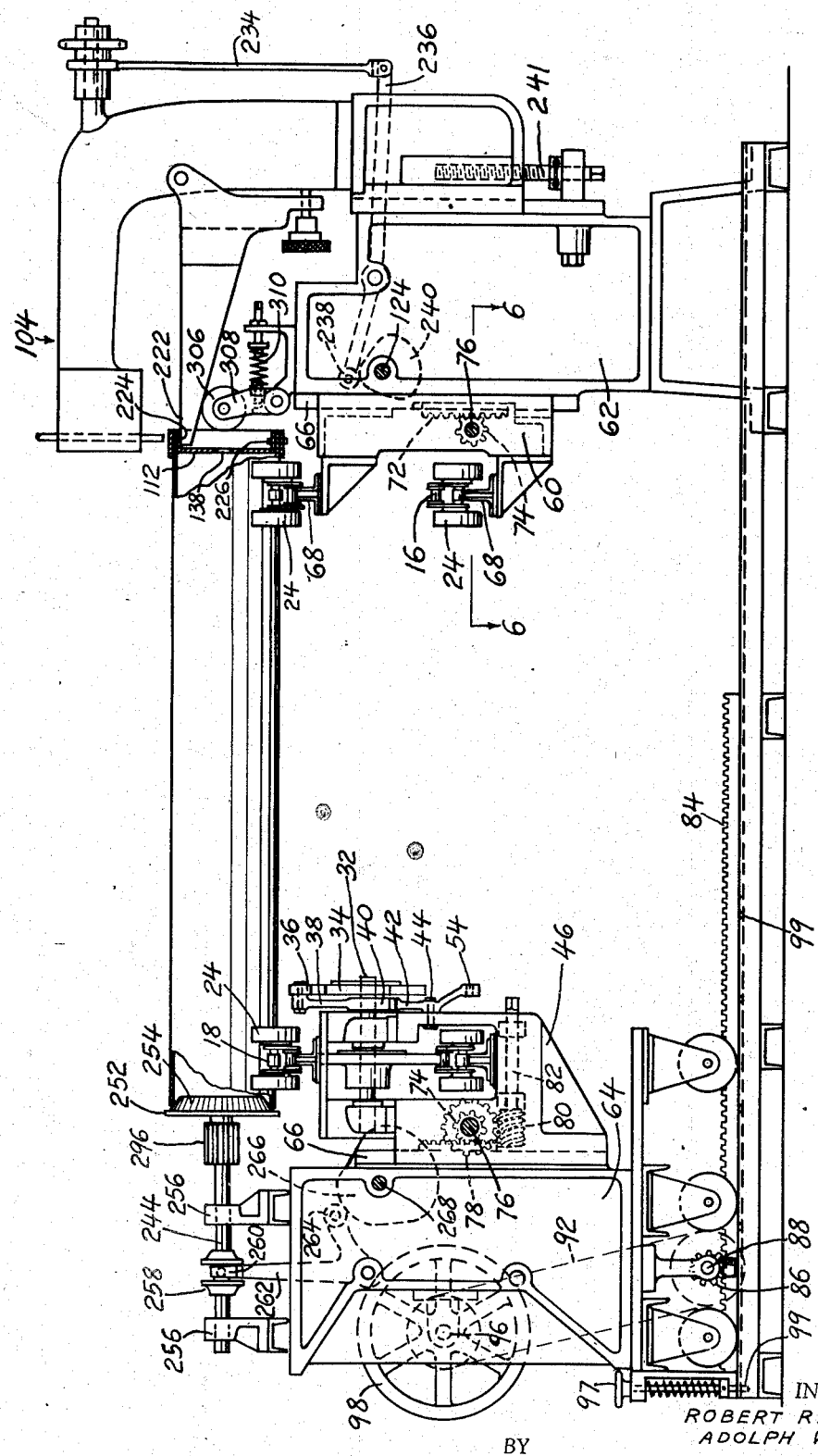

July 20, 1943.    R. R. FREDERICK ET AL    2,324,572
MEANS AND METHOD FOR SECURING ENDS TO TUBES
Filed May 12, 1941    7 Sheets-Sheet 4

INVENTORS
ROBERT R. FREDERICK
ADOLPH W. AWOT
BY Albert Sperry
ATTORNEY.

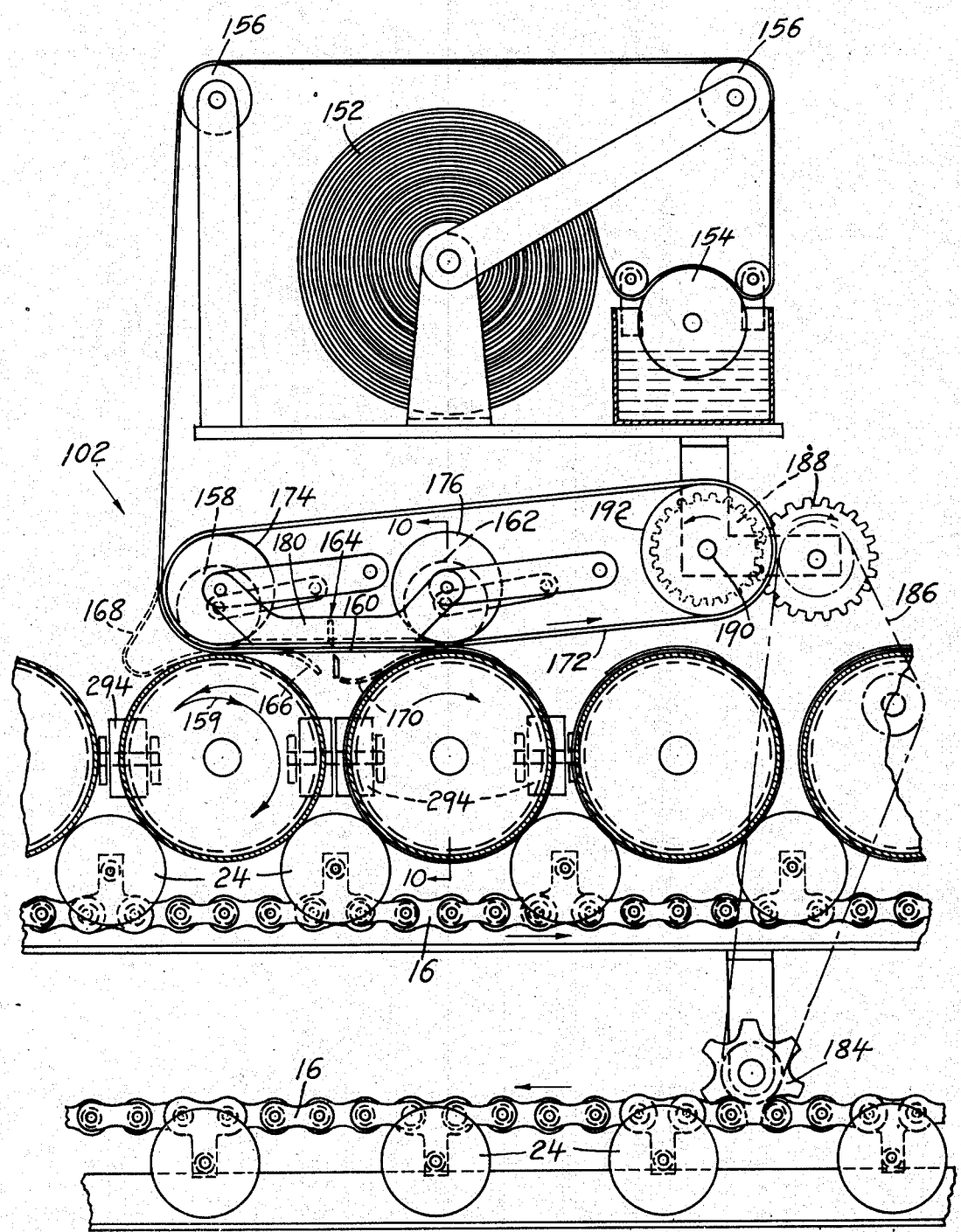

July 20, 1943.  R. R. FREDERICK ET AL  2,324,572
MEANS AND METHOD FOR SECURING ENDS TO TUBES
Filed May 12, 1941  7 Sheets-Sheet 7

INVENTORS
ROBERT R. FREDERICK.
ADOLPH W. AWOT.
BY Albert Sperry.
ATTORNEY.

Patented July 20, 1943

2,324,572

UNITED STATES PATENT OFFICE 2,324,572

MEANS AND METHOD FOR SECURING ENDS TO TUBES

Robert R. Frederick, Cheltenham, and Adolph W. Awot, Upper Darby, Pa., assignors to Sloane-Blabon, Trenton, N. J., a corporation of New Jersey Application May 12, 1941, Serial No. 393,136

23 Claims. (Cl. 93—39.1)

This invention relates to methods and means for securing end members to tubes.

While the present invention is capable of use in securing end members to tubes of various types, it is particularly designed, and is hereinafter described, as used in securing end members to tubes formed of paper or other fibrous material. Paper tubes which are closed at one end are frequently used in forming packages to receive rolls of floor covering or the like. When so used two tubes are slipped over opposite ends of the roll and are connected at the center of the roll by tape or other suitable means. The end members of such tubes have heretofore been applied to the tube by hand, and tape has been wrapped about the end of the tube after which staples are driven through the tape, tube and end member to secure the parts in place. However, these operations when carried out by hand are slow and expensive and the finished tubes are irregularly formed.

In accordance with the present invention, the operations of applying the closure member to the end of the tube, as well as the operations of applying tape to the tube and stapling the end member in place are all carried out automatically by mechanism which is coordinated to perform these steps accurately, quickly, and in timed relation, so that the tubes are fed into the machine at one end thereof and the finished tubes are delivered from the other end of the machine in rapid succession.

One of the features of the present invention resides in the method of coordinating the operations to which the tubes are subjected whereby the operations are carried out in the desired order, in timed relation, and at relatively high speed.

Another feature of the present invention resides in the adjustability of the elements whereby tubes of different length and different diameter may be operated upon by the machine.

A specific feature of the present invention resides in certain novel elements and the manner of actuating the same to apply tape to the end of the tube to which the closure member is applied.

In the preferred form of our invention herein described the tubes are received by a carrier which moves the tubes past each of a plurality of stations and one operation is performed at each station. The carrier is moved intermittently and the tubes are momentarily held in place at each station for the completion of operations to be performed thereon. When all of the operations necessary to form the desired type of end construction have been completed the tube is delivered from the machine in a finished condition.

The type of end construction to be produced determines the arrangement of the elements of the combination and the order in which the operations are performed on the tubes as they are passed through the machine. Thus, for example, the tube may first be fed to a device which applies an end member to the tube and may then be passed to a taping device which applies tape to the end of the tube to prevent unwrapping of the material of which the tube is formed. The taped tube with the closure member applied thereto may then pass to a stapling device which drives staples through the tape and tube and through the closure member to secure the end member permanently in place. However, if preferred the sequence of operations may be varied to apply the tape to the end of the tube after the staples have been applied for securing the closure member in place. The staples are then concealed by the tap and the appearance of the product is improved. Similarly the end of the tube may be taped before the end member is applied to the tube thereby strengthening the end of the tube and preventing distortion or injury to the tube during the operation of applying the end member to the tube. In some instances it is also possible to omit either the taping or the stapling operation, particularly when using an end member which is formed of metal or one which extends about the outside of the tube instead of one which is inserted into the end of the tube.

It is not only possible to vary the construction of the machine and the sequence of operations to produce a particular type of end construction, but the mechanism is so designed that in the event any one or more operations should not be required they may be easily omitted and if any of the devices employed for performing the various operations should fail to function for any reason, the remaining operations may be performed by the machine and the tubes may be completed by hand. In this way our invention can be employed for producing different types of end constructions and may be used for applying various types of end members to various types of tubes.

One of the objects of our invention is to provide an improved device for securing end members to tubes.

A further object of our invention is to provide coordinated means for applying a closure member to a tube and for securing the closure member to the tube.

Another object of our invention is to provide improved means for applying tape to the end of a tube.

Another object of our invention is to provide novel methods whereby closure members may be applied and secured to the ends of tubes in rapid succession.

A particular object of our invention is to provide a machine with means for applying an end member to a tube, means for applying tape to the tube adjacent the end thereof and means for securing the end member to the tube, together with mechanism for coordinating the operation of said means whereby these operations may be performed simultaneously at different stations and upon different tubes as they are passed through the machine.

These and other objects and features of the present invention will appear from the following description thereof, in which reference is made to figures of the accompanying drawings.

In the drawings:

Fig. 3 is an enlarged view of one part of the mechanism illustrated in Fig. 1 showing typical intermittent drive means for the carrier chains.

Fig. 4 is an enlarged view of another portion of the mechanism illustrated in Fig. 1 showing typical adjusting means therefor.

Fig. 5 is an enlarged view of a portion of the mechanism illustrated in Fig. 1 as seen from the right hand side, with certain parts removed.

Fig. 9 is an enlarged view of a typical tape applying device included in the construction of Fig. 1.

Figure 1:
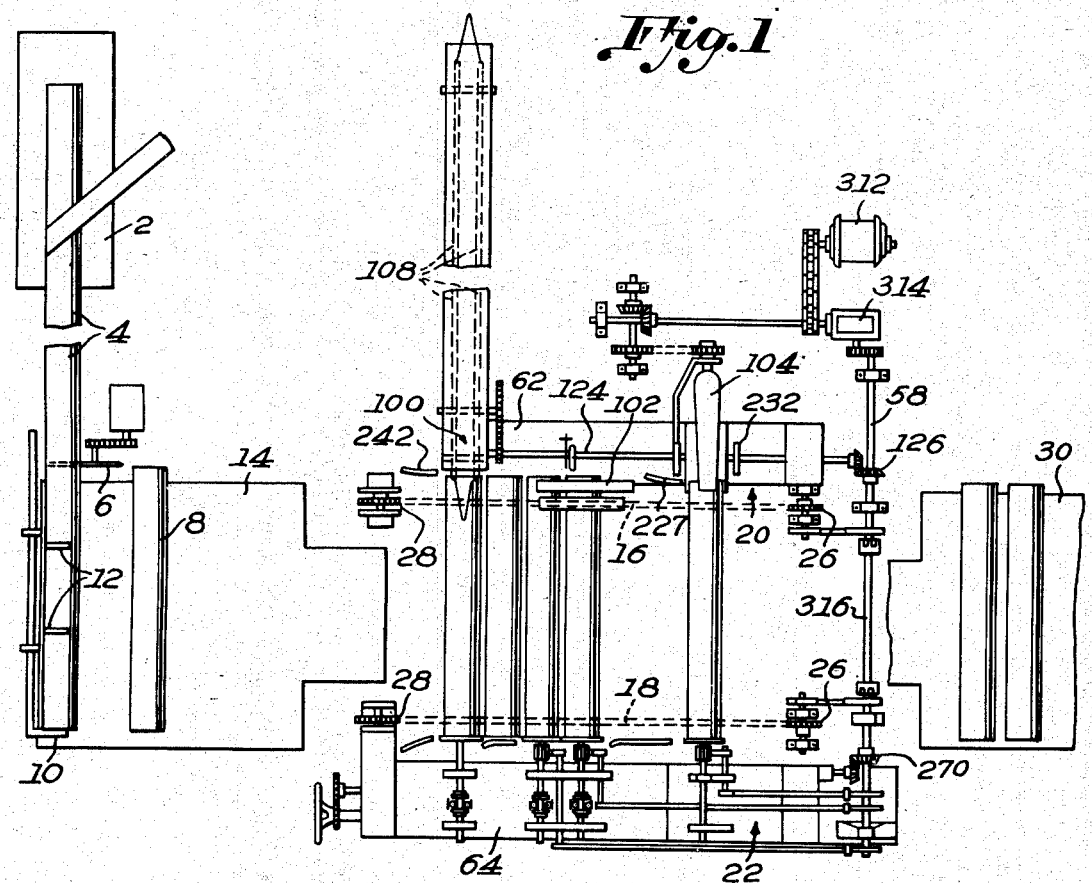
Fig. 1 is a diagrammatic plan view of a typical machine embodying the present invention.

In that form of our invention chosen as illustrative thereof and shown in the figures of the drawings, the machine is used in combination with a conventional tube forming device in which a continuous length of spirally wrapped paper tubing is fed to a cutting device to sever the tubing into individual tubes of any desired length. Referring to the diagrammatic showing in Figs. 1 and 2, the tube forming machine 2 produces a continuous length of spirally wrapped paper tubing 4 which is fed to a cutter 6. The cutter is movable with the tubing and operates to sever the tubing into lengths to form the individual tubes 8. The length of these tubes is controlled by a stop 10 which is adjustable lengthwise of the tube guide 12.

Figure 2:
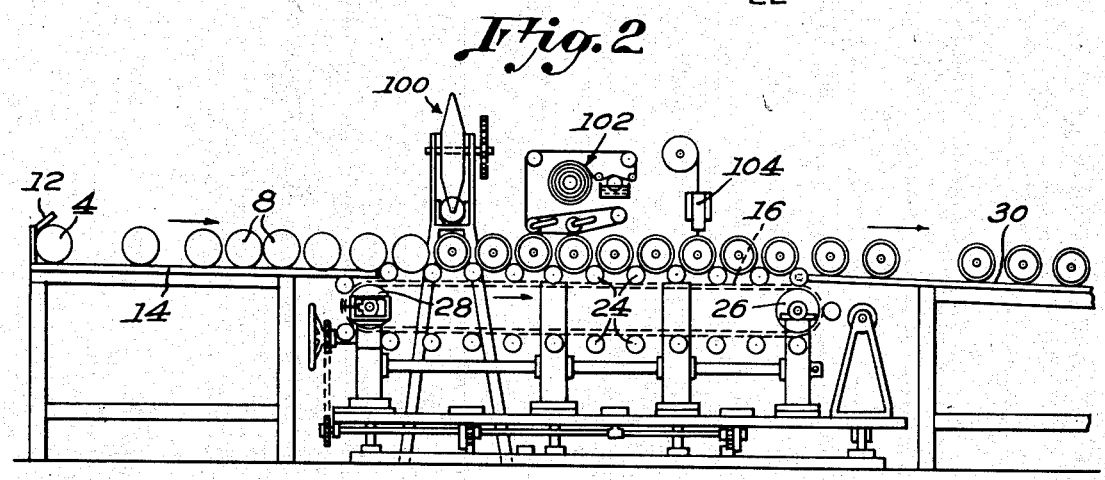
Fig. 2 is a diagrammatic view in elevation of the machine illustrated in Fig. 1 facing the operating side thereof of Fig. 1.

The tubes 8 pass from the guide 12 to an inclined feed table 14 which holds a number of tubes in readiness to be received by a carrier which moves the tubes through the machine. The carrier may be of any desired type but, as shown, is in the form of spaced chains 16 and 18. The chain 16 is located on the operating side 20 of the machine and the chain 18 is located on the control side 22 of the machine. These chains are identical and each is provided with rollers 24 spaced to receive and support the tubes supplied from the feed table 14. The chains pass about sprockets 26 at the driving end of the machine, shown at the right in Fig. 1, and about adjustable idler sprockets 28 near the feed table. The movement of the carrier chains is in a clockwise direction as seen in Fig. 2 and the tubes are supported on the upper run of the chains and pass from the feed table 14 to the discharge table 30.

The carrier chains are driven by intermittently operating means whereby the tubes are advanced step by step from one station to another through the machine and are held momentarily at each station while operations are performed thereon and before being advanced to the next station. The drive means preferred are illustrated in Figs. 3 and 5, and are located on opposite sides of the machine. The construction of the drive means is the same and therefore only the drive means on the control side of the machine will be described in detail. As shown in Fig. 3 the driving sprocket 26 about which the chain 18 passes is secured to a shaft 32 provided with a ratchet wheel 34. A pawl 36 engages the ratchet wheel and is carried by an arm 38 which projects from a member 40 rotatably mounted on the shaft 32. A lever 42 is pivotally supported at 44 on the vertically movable bracket 46 and is provided on one end with a gear segment 48, the teeth of which mesh with teeth 50 on the member 40. The lever 42, when rocked about its pivot 44, therefore serves to oscillate the arm 38 and pawl 36 to rotate the ratchet wheel 34 and the chain driving sprocket 26 a quarter revolution. The lever 42 is actuated by a link 52 connected to the pin 54 of the lever and reciprocated by the eccentric 56 on main drive shaft 58. Rotation of the drive shaft is thus caused to reciprocate link 52 and rock the lever 42 whereby the carrier chain 18 and the tubes carried thereby are advanced step by step through the machine and remain stationary during the intervals when the arm 38 and the pawl 36 are returning to engage another tooth on the ratchet wheel 34.

Figure 6:
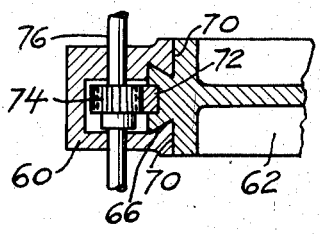
Fig. 6 is a horizontal sectional view of a detail of the construction illustrated in Fig. 5 taken on the line 6—6 thereof.

In order that the machine may be used to perform the desired operations on tubes of different diameters the carrier chains 16 and 18 and the sprockets 26 and 28 about which they pass as well as the intermittently operating drive means for the chains are carried by vertically adjustable brackets 46 and 60 as shown in Figs. 5 and 6. For this purpose the frame 62 on the operating side and the frame 64 on the control side are formed with vertically extending dovetail slides 66 for receiving and holding the vertically movable brackets. The brackets 46 carry the sprockets 26 and 28 and the drive means for the chains whereas the intermediate brackets 80 carry tracks 68 for the chains 16 and 18. The chain tracks 68 shown are in the form of angle irons along which the chains travel to prevent sagging of the chains and to hold the tubes in position for operation thereon. The face of each slide, between the bearing surfaces 70 Fig. 6, is provided with a rack 72 engaged by a pinion 74 mounted on the bracket and secured to a shaft 76 which passes through all of the brackets. A worm gear 78 on the end of the shaft 76 meshes with a worm 80 on shaft 82 to rotate the shaft and pinion a predetermined distance and thereby simultaneously raise or lower the carrier supporting brackets. The worm gear 78 preferably is provided with an index plate 83 graduated in terms of tube diameters and cooperating with a pointer 85 mounted on the bracket to indicate the desired adjustment of the chains with respect to the devices located on the operating side of the machine to operate on the tubes. The worm gear and worm cooperate to retain the chains in any adjusted position and it is preferred that the adjustments be made to maintain the tubes in a horizontal position as they pass through the machine.

In order to adjust the machine to operate on tubes of different lengths the mechanism mounted on the control side 22 of the machine is movable toward and away from the operating side 20 of the machine. For this purpose racks 84 are fixedly secured to the floor or other support for the machine and are engaged by pinions 86 carried by a shaft 88 extending longitudinally of the frame 64. A sprocket 90 on shaft 88 is connected by a chain 92 to a sprocket 94 on shaft 96. Movement of the frame 64 and the mechanism carried thereby toward and away from the operating side of the machine is effected by rotation of a hand wheel 98 on shaft 96 whereby the shaft 88 and pinions 86 are rotated to shift the frame as desired. The frame 64 may be held in any adjusted position by suitable means such as the spring pressed plunger 97 which is carried by the frame 64 and projects into holes 99 in the support for rack 84 to prevent displacement of the frame during operation.

In moving through the machine the tubes are passed to a first station where a first device is located for operating on the tube and thereafter are moved on to a second and third station. In the construction illustrated in Fig. 1 the device located at the first station is a suitable form of end member applying device 100 which applies a cup shaped end member to the open end of each tube. The device located at the second station is a tape applying device 102 and the device located at the third station is a stapling device 104. However, as pointed out hereafter, the order and arrangement of these devices may be varied to produce a particular form of end construction.

Figure 10:
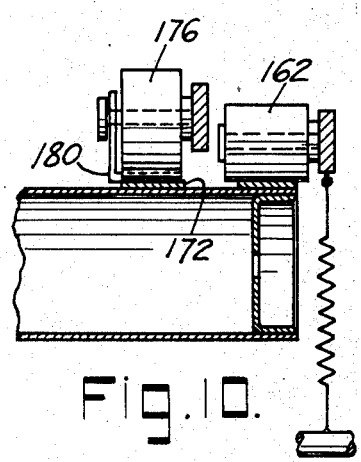
Fig. 10 is a vertical sectional view of a detail of the construction illustrated in Fig. 9, taken on the line 10—10 thereof.
Figure 7:
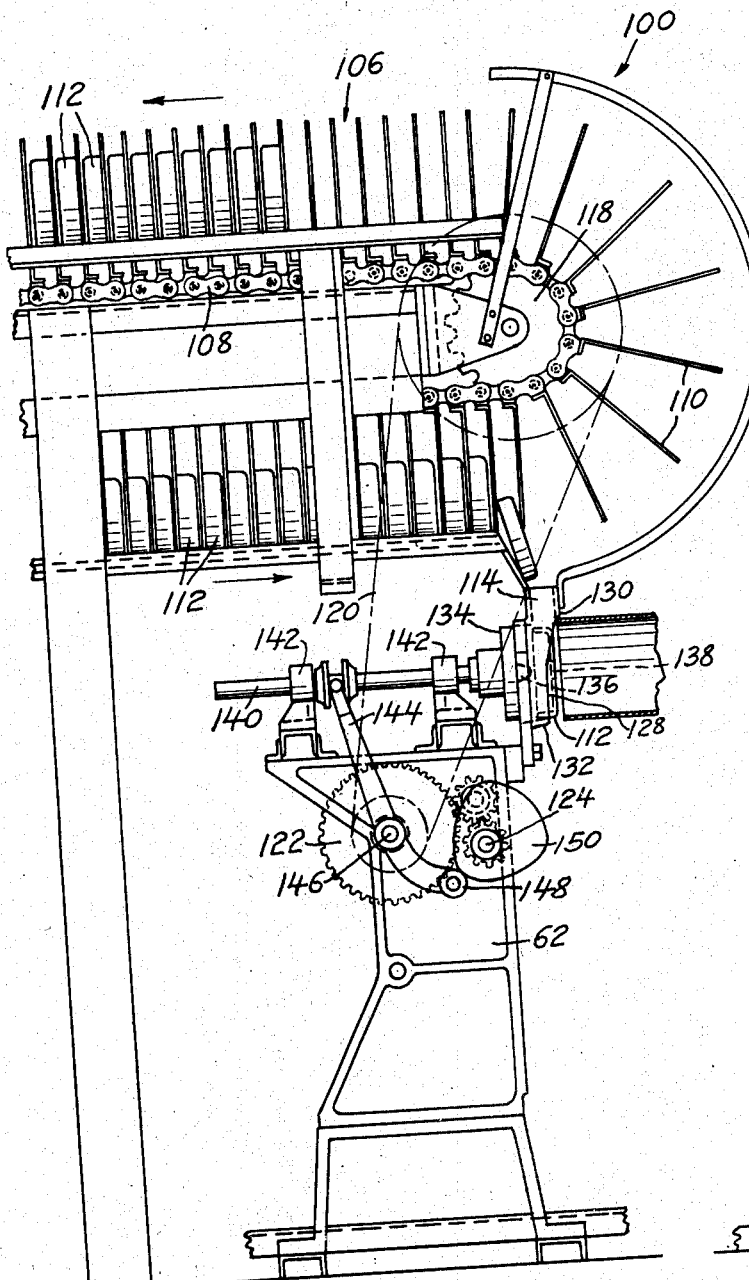
Fig. 7 is an enlarged side elevation of a typical end applying device included in the construction of Fig. 1.
Figure 14:
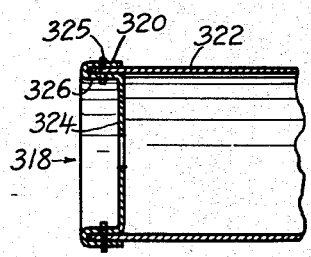
Figure 15:
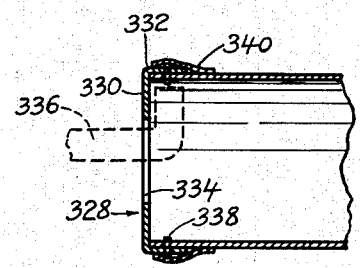

The end member illustrated in Figs. 7 and 10 is designed to be inserted into the end of the tube but it will be evident that the end member may extend about the outside of the tube as shown in Figs. 14 and 15.

Figure 8:
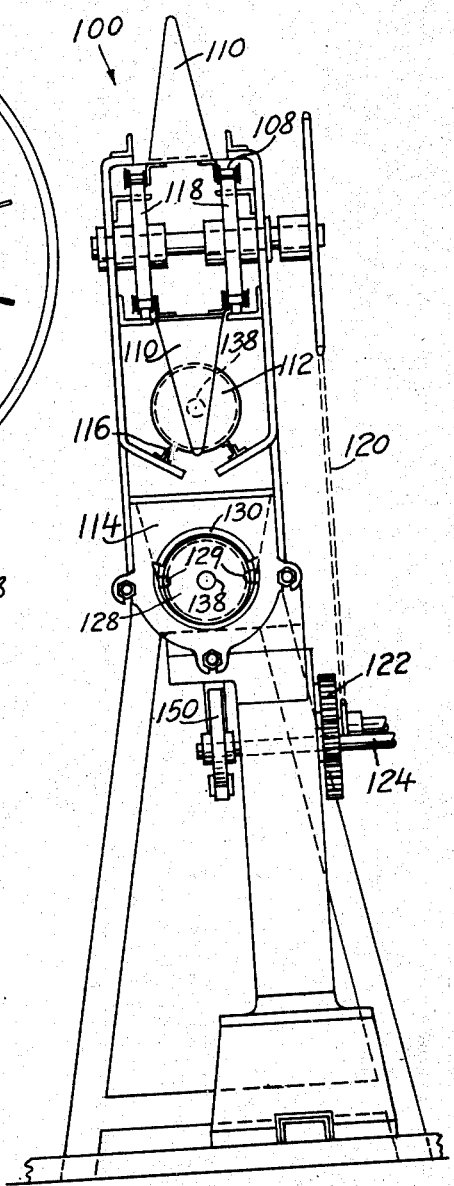
Fig. 8 is a front elevation of the end applying device of Fig. 7.

The device 100 shown in Figs. 7 and 8 is supplied with end members from a magazine 106 in the form of a chain 108 carrying partitions 110 which project therefrom. The end members 112 are placed in the spaces between the partitions 110 and are moved toward the head 114 of the end member applying device 100 along the tracks 116. The chain 108 and partitions 110 pass about a sprocket 118 which is driven by the chain 120 and gearing 122 from the shaft 124. The shaft 124 is driven from the main drive shaft 58 through the beveled gears 126 (Fig. 1) and the drive is so timed with respect to the movement of the carrier chains 16 and 18 that one cup is dropped into the head 114 of the end member applying device 100 on each advancing movement of the carrier and tubes through the machine.

The head 114 is provided with an opening 128 in the front thereof through which the end members are moved into engagement with the ends of the tubes supported on the carrier chains. The upper edge of the opening 128 is formed with a lip 130 beneath which the end of the tube is pushed and serving to hold the tube in place with respect to the opening 128 while abutment pieces 129 on the sides of the opening engage the end of the tube to prevent it from being pushed through the opening 128 into the head. The lower edge of the opening 128 is provided with a marginal lip 132 which serves as a stop for positioning the cups dropped into the head from the magazine 106 so that they may be inserted into the tube located in front of the opening 128.

The end member 112 is moved through the opening 128 in the head and into the end of a tube supported on the carrier by means of a pusher 134 formed with a conical pin 136 in the center thereof. The pin 136 enters an opening 138 in the end member and thus serves to center the end member so that it will register accurately with the tube on the carrier and will not be twisted or tilted by engagement with the end of the tube. On movement of the pusher 134 to the right as seen in Fig. 7 the end member is pushed through the opening 128 and into the adjacent end of the tube held in position in front of the head by the carrier chains.

The movement of the pusher in inserting caps into the tubes is timed to operate only when the carrier chains are at rest and a tube is held in position to receive the end members. This movement of the pusher is effected by a rod 140 mounted in bearings 142 and actuated by a lever 144 pivotally mounted at 146 on the frame 62. The lower end of the lever 144 is provided with a follower 148 which engages the cam 150 mounted on the shaft 124 which also serves to drive the mechanism for feeding the end members to the head 114. The position and form of the cam 150 is such that on rotation of the shaft 124 the lever 144 is rocked and the pusher 134 moves to the right during that period when the carrier chains 16 and 18 are stationary and a tube is located in position to receive an end member from the head 114 of the end member applying device.

The tube to which the end member has been applied is then passed on to the second station where a second operation is performed thereon. The second device is shown in Fig. 1 as a tape applying device 102 and as shown in detail in Figs. 9 and 10 embodies a support carrying a roll of tape 152 which is moistened by the roll 154. The tape passes from the moistening roll about the idlers 156 and beneath the pressure roll 158 into engagement with the tubes. As each tube passes beneath the roll 158 the tape is pressed against the tube and thereafter the tube travels on as the carrier advances drawing a length of tape 160 from the roll 154. In this way the tube to which the tape is first attached is moved into position beneath a second pressure roll 162 and a second tube is moved into position beneath the first pressure roll 158. The tape then extends from one tube to another and adheres to both tubes. When in this position the tape 160 is severed between the tubes to which it adheres by the shear 164. The tube beneath the pressure roll 158 is then rotated a short distance in a counter-clockwise direction as seen in Fig. 9 to secure the cut end 166 of the tape to the tube during which rotation the tape is moved to the dotted line position 168. Thereafter the tube is rotated a short distance in a clockwise direction to wrap the tape a part of the way about the tube, as shown by the reversing arrow on the tube beneath the pressure roll 158 in Fig. 9. The tube beneath the second pressure roll 162 to which the tape was previously attached in the manner described is rotated in a clockwise direction to secure the opposite cut 170 of the tape to the tube. Both tubes are then advanced by the carrier, the tube which is completely taped passing on to the next station, and the tube located beneath pressure roll 158 and only partially taped moving beneath the pressure roll 162 and drawing an additional length of tape from the roll 152.

In order to cause the tube, located beneath the roll 158 and to which the tape is first attached, to draw tape from the roll as the tube is advanced to a position beneath roll 162, instead of turning backward and stripping the tape from the tube, a belt 172 is passed about the rollers 174 and 176 and bears against the tubes at points spaced from the end of the tubes as shown in Fig. 10. A metal shoe 180 extends between the rollers 174 and 176 to hold the belt 172 in engagement with the rollers and the belt is driven intermittently and in timed relation with the carrier by a sprocket 184 which engages the lower run of the chain 16 and is connected by chain 186 and gears 188 to the shaft 190 by which the driving roll 192 is carried.

Figure 11:
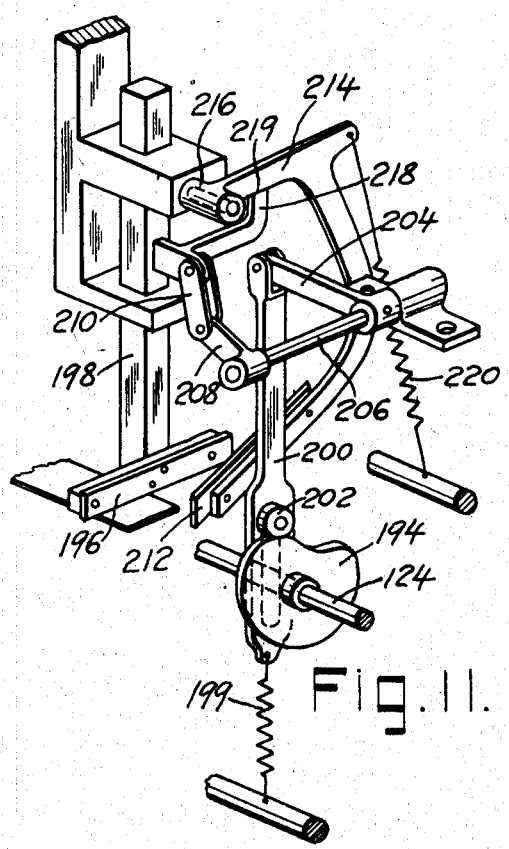
Fig. 11 is a diagrammatic view in perspective of a typical shear embodied in the construction of Fig. 9.

The operation of the shear is effected by suitable means which as shown in Fig. 11 are actuated by the cam 194 on cam shaft 124 and timed to take place immediately after the tubes have come to rest beneath the pressure rollers 158 and 162.

The upper blade 196 of the shear is carried by the square shaft 198 and raised to clear the tubes as they advance and thereafter lowered to engage the upper surface of the tape. This movement is effected by the operation of spring 199 on the member 200 which carries the cam follower 202 and is connected at its upper end to the arm 204 on rock shaft 206. The arm 208 on shaft 206 is connected to the square shaft 198 by the link 210 so that the cam 194 rotates the square shaft and upper knife blade 196 are raised and lowered in a predetermined manner.

The lower blade 212 of the shear is carried by a blade carrying member 214 pivotally mounted at 216 on a stationary portion of the frame. An angularly formed projection 218 is movable with the squared shaft 198 and is raised thereby so that the end 219 of the angular projection will engage the member 214 and swing the member 214 about its pivot 216 to move the lower blade 212 rearwardly as the upper blade rises, thus separating the blades. When the squared shaft and upper blade are lowered the angular projection 218 moves downward with the squared shaft and the member 214 swings downward and inward under the action of spring 220 moving the lower blade 212 of the shear inward and upward so that it cooperates with the upper blade to sever the tape between the tubes at a predetermined time in the course of the taping operation.

Figure 12:
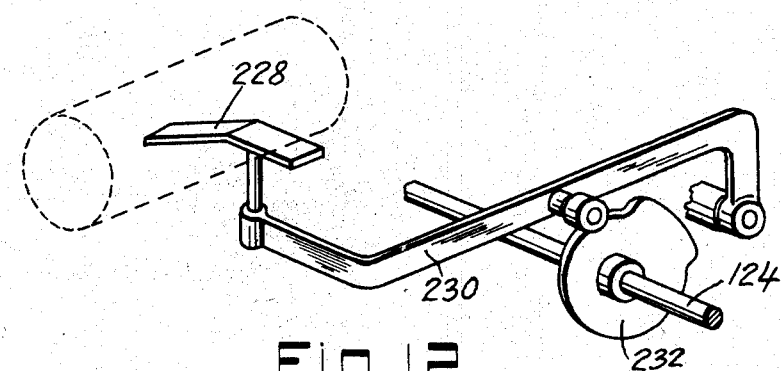
Fig. 12 is a diagrammatic view in perspective of a detail of the stapling device included in the construction of Fig. 1.

On completion of the taping operation the carrier chains move the tube on to the third station where it is again operated upon by means, such as the stapling device 104 shown in Fig. 5. The stapling device may be of a conventional type and is provided with an anvil or foot 222 over which the end of the tube is passed so that the inner marginal face 224 of the cup shaped end member will bear against the anvil and the stapling device may act in driving the staples 226 through the tube and cup and bend the ends of the staples into their holding positions. In order to cause the end of the tube to clear the anvil 222 of the stapling device as it is advanced by the carrier, a deflector plate 227 (Fig. 1) is mounted on the frame 62 between the taping device and the stapling device. It is also preferable to raise the end of the tube adjacent the anvil 222 before it is pushed inward over the anvil into its stapling position. For this purpose, a lifter 228, shown in Fig. 12, is located beneath the anvil and supported on a lever 230 which engages a cam 232 on cam shaft 124. The formation of cam 232 is such that the end of the tube adjacent the anvil of the stapler is raised as soon as the tube comes to rest in front of the stapling device and before it is pushed transversely of the carrier into engagement with the anvil of the stapler.

After the tube is in place with the surface 224 of the end member in engagement with the upper surface of the anvil 222 the stapler is actuated to drive a staple through the tape, tube and end member. Thereafter the tube is rotated successively through partial revolutions to permit other staples, say five in all, to be applied to the tube and end member at spaced points about the circumference thereof. The operation of the stapling device is controlled by a trip 234 which is actuated by a lever 236 having a follower 238 thereon engaging the cam 240 on the shaft 124 which also controls the operation of the various elements of the end member applying device 100 and the taping device 102. The anvil and stapler may be raised and lowered to operate on tubes of different diameters by adjusting means 241.

Upon completion of the stapling operation, the end construction of the tube has been completed and the carrier chains move on and pass about the sprockets 26 delivering the finished tube to the discharge table 30.

The tubes in moving to the end applying device 100 are shifted away from the head 114 by a deflector plate 242 (Fig. 1) so that the ends of the tubes will clear the head. They are also shifted transversely of the carrier before passing into position to be operated upon by the stapling device by deflector plate 227. It is therefore necessary to move each tube toward the opening 128 in the head of the end applying device 100 and to push them inward over the anvil 222 of the stapler after they have been raised by the lifter 228. Furthermore the tubes are each rotated in a predetermined manner during the taping and stapling operations. These movements of the tube with respect to the carrier chains 16 and 18 are effected by mechanism located on the control side 22 of the machine.

Figure 13:
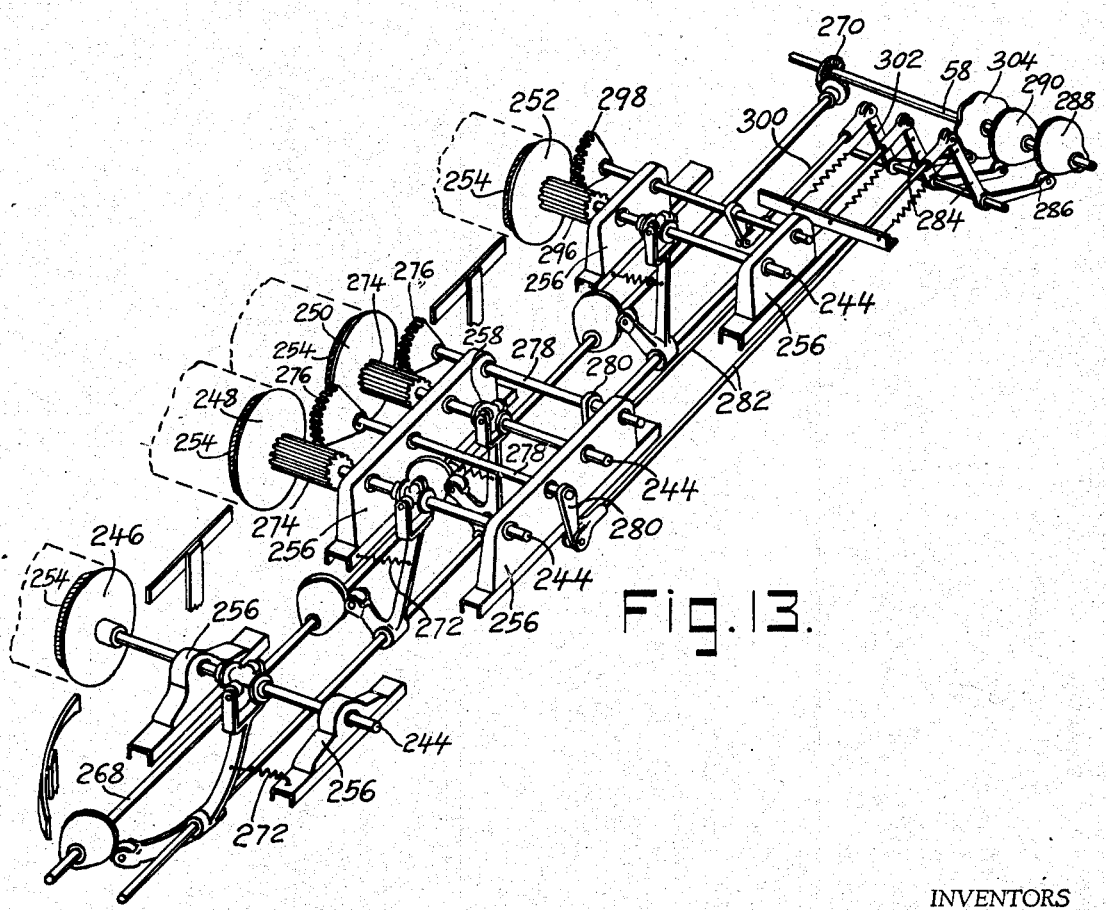
Fig. 13 is a diagrammatic view in perspective of a portion of the control side of the machine illustrated in Fig. 1, and Figs. 14 and 15 are longitudinal sectional views of alternative forms of tube end constructions which may be produced in accordance with our invention.

As shown in Figs. 5 and 13 the control side of the machine is provided with a frame 64 upon which are mounted four shafts 244 having members 246, 248, 250 and 252 secured to the ends thereof. Each of these members is provided with a conical tube engaging surface 254, Fig. 5, adapted to enter the open ends of the tubes to frictionally engage and move the tubes. The shafts 244 are slidably and rotatably supported in bearings 256 on the frame 64 and each is provided with a collar 258 engaged by the yoke 260 on the upper end of a pivoted lever 262. The lower ends of levers 262 are provided with followers 264 which engage cams 266 on the cam shaft 268. The cam shaft is driven from the main drive shaft 58 by bevel gears 270 and therefore the operation of the cams 266 and the movement of the members 246, 248, 250 and 252 is coordinated with the movement of the carrier and the operation of the devices on the operating side 22 of the machine. The followers 264 or the levers are urged against the cams 266 by means of springs 272.

The member 246 is located opposite the end applying device 100 and cooperates therewith to move each tube into engagement with the head 114 thereof. For this purpose the member 246 is actuated by its cam 266 while the tube in front of the member is at rest. The member 246 is moved to the left as seen in Fig. 13 to bring the conical surface 252 thereof into engagement with the end of the tube to move the tube transversely of the carrier against the outer face of the head 114 and beneath the lip 130 above the opening 128 in the head. The end of the tube to which the end member is to be applied is thus held in place by the lip 130 and the rollers 24 on the carrier and is retained in position to receive the end member from the pusher 134 of the device 100.

After the end member has been inserted into the tube the cam 266 serves to withdraw the member 246 from the end of the tube to allow the tube to be advanced by the carrier to the next station.

The taping operation performed by the device 102 may be considered as embodying two steps since the operation is not completed until the tube has been advanced one step by the carrier from a position beneath the pressure roller 158 to a position beneath the pressure roller 162 and while the tape is still attached to the tube. For this reason the members 248 and 250 which cooperate with the taping device 102 are located side by side at the second station on the control side of the machine and opposite the pressure rollers 158 and 162 of the taping device.

The members 248 and 250 are each moved into and out of engagement with the ends of the tubes by levers 262 and cams 266. However the shafts 244 upon which the members 248 and 250 are mounted are each provided with gear teeth 274 engaged by gear segments 276 for rotating the members 248 and 250. The gear teeth 274 are extending longitudinally of the shafts 244 so that they remain in engagement with the teeth of gear segments 276 during movement of the members 248 and 250 into and out of engagement with the tubes.

The gear segments 276 are secured to the rock shafts 278 which in turn are provided with actuating arms 280 connected to operating rods 282. The operating rods are connected to levers 284 which are actuated by the followers 286 engaging cams 288 and 290 on the main drive shaft 58.

The cam 288 which controls the rotary motion of the member 248 is so formed that after the member has moved into engagement with the adjacent end of the tube the gear segment 276 associated therewith first is moved a short distance in a clockwise direction as seen in Fig. 13 to cause the member 248 and the tube engaged thereby to be rotated in a counter-clockwise direction through about a quarter revolution. This movement of the tube and member 248 takes place immediately after the operation of the shear 164 cuts the tape extending between the tube beneath the pressure roll 158 and the tube beneath the pressure roll 154 and is represented by the shorter portion of the arrow 159 on Fig. 9. By rotating the tube in a counter-clockwise direction the cut end 166 of the tape is pressed against the tube by the pressure roller 158 so as to adhere thereto.

The form of cam 288 is such that after first rotating the tube and member 248 in a counter-clockwise direction it then rotates them in a clockwise direction for about two-thirds of a revolution so that the tape extends about the tube and beneath the belt 172 and pressure roller 158. After these operations the cam 266 associated with the member 246 serves to retract the member from the end of the tube and the tube moves on with the carrier into position to be engaged by the member 250.

The cam 290 which controls the rotary movement of the member 250 is so formed that the gear segment 276 associated therewith moves only in a counter-clockwise direction to rotate the tube and member in a clockwise direction as seen in Figs. 9 and 13 to cause the pressure roller 162 on the taping device to press the moistened tape against the tube and secure the cut end 170 thereof to the tube. The timing of the rotary movement of the members 248 and 250 is such that the surfaces 254 thereof are moved into frictional engagement with the tubes prior to rotation of the members and the tubes and are retracted from the tubes after the operations are completed to permit the tubes to be advanced by the carrier.

Since the members 248 and 250 urge the tubes toward the taping device and then rotate the tubes, the taping device is provided with positioning rollers 294 (Fig. 9) which are located below the pressure rollers 158 and 162 to engage the ends of the tubes without impeding rotation thereof.

The member 252 on the control side of the machine is located opposite the stapling device 104 and serves to push the tubes adjacent thereto over the anvil 222 of the stapler and to rotate the tube so that the desired number of staples may be applied at spaced points about the circumference of the tube. For this purpose the shaft 244 which carries the member 252 is formed with extended gear teeth 296 and a pivoted gear segment 298 connected by cam rod 300 to the pivoted lever 302 like those associated with the members 248 and 250. The lever 302 is actuated by the cam 304 on the main drive shaft 58. The latter cam is so formed and positioned that, after the member 252 has moved into engagement with the end of a tube and has pushed the tube over the anvil of the stapler, the tube is rotated in successive steps through limited arcs with a momentary pause between each step to permit the stapling device to operate on the tube while the tube is at rest. It will be evident that the cam 240 which controls the tripping and operation of the stapling device must be so positioned and timed in relation to the cam 304 that the stapling operations will occur during the intervals between successive partial rotations of the tube by the member 252. After the desired number of staples, say five, have been applied to the tube the member 252 is withdrawn from engagement with the tube and the finished tube is moved on by the carrier and discharged onto the table 30.

In order to permit free rotation of the tube during the stapling operation, the stapling device is provided with positioning rollers 306 located below the anvil of the stapler in position to be engaged by the end of the tube. These rollers are carried by a pivotally mounted frame 308 and urged toward the tube by a spring 310. When the tube is pushed toward the stapler and over the anvil thereof the rollers therefore move to the right as seen in Fig. 5 but when the member 252 is retracted from the opposite end of the tube after completion of the stapling operation the spring 310 serves to push the rollers 306 to the left and thereby disengages the tube from the anvil of the stapling device.

The machine described may be driven by any suitable source of power such as the motor 312. It is preferable to employ a variable speed motor or one having a variable transmission and a speed reducer 314 is generally coupled between the motor and the main drive shaft 58. In order to permit movement of the frame 64 toward and away from the frame 62 to adjust the machine for handling tubes of various lengths, the main drive shaft 58 is preferably provided with extensible or interchangeable sections shown at 316 so that a portion of the shaft between the operating and control sides of the machine may be inserted, replaced or extended to maintain the desired driving and timing relation between the elements on the opposite sides of the machine.

The operation of the machine illustrated is believed to be obvious from the foregoing description. However it may be summarized as follows:

The machine is adjusted to operate on the particular tubes being produced by the tube forming device 2. This adjustment is effected by rotating the hand wheel 98 to move the frame 64 and carrier chain 18 toward or away from the operating side 20 of the machine until the desired tube length adjustment has been made. The chains 16 and 18 are also raised or lowered by rotation of the shafts 82 to adjust machine to handle tubes of different diameters.

When the desired adjustments have been made the tube forming machine is set in operation and tubes cut to the desired length are passed to the feed table and picked up by the carrier to move the tubes through the machine. The tubes are advanced intermittently by the carrier and when brought to rest at the first station the tube is given a first operation, which may be that of applying tape to the end of the tube, but is shown as that of applying an end member to the tube.

When the first operation is completed the tube is advanced to a second station where, as shown, tape is wrapped about the end of the tube. On completion of this operation the tube is moved to a third station where the third or stapling operation is performed on the tube. The carrier then discharges the finished tube onto a discharge table 30 while other tubes are successively undergoing similar operations to produce tubes with end members secured thereto.

As indicated above the method of securing end members to tubes and the mechanism employed therefore are capable of variation and rearrangement to vary the order in which the operations are performed on the tubes. It is also possible to use different forms of end members and to apply them over the ends of the tubes instead of inserting them into the ends of the tubes. Thus as shown in Fig. 14 the end member 318 is formed with a marginal portion 320 which extends about the outside of the tube 322, and also is provided with a cup shaped central portion 324 so that staples 325 may be driven through both the inner portion 326 and the outer portion 318 as well as the tube. As illustrated in Fig. 14 the usual tape is omitted in which case the second station as well as the taping device 102 and the members 248 and 250 are omitted from the machine. It will be apparent however that tape may be applied to the tube either before or after the stapling operation is desired.

The form of end member 328 illustrated in Fig. 15 has a flat end 330 and a marginal portion 332. This type of end member is particularly useful when the cost of the tube is relatively high since it permits a shorter tube to be used because the end member does not project into the tube. This end member like those shown in Figs. 5 and 14 may be formed of paper, metal or any other suitable material. However, in order to carry out the stapling operation with mechanism of the type illustrated and described above, the central opening 334 in the end member is made relatively large and the anvil of the stapling device is shaped as shown in dotted lines at 336 to pass through the opening 334 and bear against the inner surface of the tube. As shown in Fig. 15 the tape is applied to the tube over the staples 338 and therefore the machine illustrated would have to be rearranged, in an obvious manner, to place the stapling device in advance of the taping device.

Since the tape 340 applied to the tube in Fig. 15 extends over the edge of the marginal portion 332 and is secured to both the end member and the tube it is possible to eliminate the stapling operation altogether and to rely upon the tape alone for securing the end member in place. When staples are not used in the construction it is not necessary to provide such a large opening in the center of the end member.

The methods of the present invention may be carried out on various types of mechanism and the particular forms of end constructions illustrated and described are generally typical of those which may be produced with the machine herein shown and described. However it will be evident that the type, style and arrangement of the machine and its parts and the methods described are capable of many changes and modifications without departing from the spirit and scope of the invention. It should therefore be understood that the particular embodiments of our invention herein described and shown in the drawings are intended to be illustrative of our invention and are not intended to limit the scope of the following claims.

We claim:

1. A machine for securing end members to tubes comprising, a carrier for receiving the tubes, intermittent drive means for advancing the carrier and tubes one step at a time through the machine, devices for applying an end member to each tube, for applying tape to each tube, and for stapling the end members to the tube, said devices being arranged in spaced relation longitudinally of said carrier, and means coordinating the operation of said devices and the operation of said carrier drive means to cause said devices to operate simultaneously on different tubes upon completion of each advancing movement of said carrier and tubes through the machine.

2. A machine for securing end members to tubes comprising a device located at one station for applying an end member to a tube, a device located at another station for applying tape to the exterior of the tube adjacent the end thereof, a device located at a third station for securing the end member to the tube, intermittently operating means for moving tubes successively to and from each of said stations and means coordinating the operation of the tube moving means and the operation of said devices to hold each tube at each station in turn until the device at said station has completed its operation on the tube.

3. A machine for securing end members to tubes comprising a device located at one station for applying an end member to a tube, a device located at another station for applying tape to the exterior of the tube adjacent the end thereof, a device located at a third station for securing the end member to the tube, a carrier for said tubes located adjacent said stations and embodying elements for supporting said tubes during operations thereon, drive mechanism for said carrier operable to move said carrier step-by-step past each of said stations in turn, and control devices coordinating the movement of said carrier and tubes and the operation of said devices to cause said carrier to remain stationary and to hold said tubes in place at said stations during operation of said devices.

4. A machine for securing end members to tubes comprising a carrier for advancing tubes through the machine, a device for applying an end member to each tube, a device for wrapping tape about the end of each tube, a device for driving a staple through each tube and end member to secure them together, said devices all being located on one side of the carrier and in spaced relation longitudinally thereof to operate successively on one end of each tube, tube engaging members cooperating with said devices and located adjacent the opposite side of said carrier in position to engage the opposite end of each tube and means for actuating said members to move said tubes with respect to said carrier and devices during operation of said devices.

5. A machine for securing end members to tubes comprising a carrier for receiving and holding tubes to be operated upon, intermittently operated drive means for advancing said carrier and tubes through the machine with a step-by-step movement and serving to move each tube from one station to another and to hold each tube at each station momentarily before again advancing the same, a device located at one of said stations and adjacent one side of said carrier for applying end members to one end of each tube, a device for wrapping tape about the end of the tube to which said end member is applied, a device for driving staples through said tube and end member, said devices all being located on the same side of said carrier at longitudinally spaced stations along said carrier, members for moving said tubes with respect to said carrier and devices, and means coordinating the operation of said carrier, devices and members to actuate both the devices and the members during the intervals between successive advancing movements of the carrier and tubes.

6. A machine for applying tape to tubes comprising a carrier having means thereon for holding tubes in predetermined positions with respect thereto, intermittently operating means for driving said carrier to advance the carrier and tubes in successive steps through the machine with an interval of rest between successive advancing movements, a taping device located on one side of said carrier in position to apply tape to each tube adjacent the end thereof, a member located on the opposite side of said carrier in position to engage the opposite end of each tube to be operated upon by said device, means for moving said member into and out of engagement with each tube, means for rotating said member and the tube engaged thereby about the longitudinal axis of the tube, and means coordinating the operation of said carrier, device and member to cause said carrier to hold each tube momentarily in position with the opposite ends thereof adjacent said device and member and to cause said member to rotate each tube while the tube is so held and while operated upon by said device.

7. In a machine for securing end members to tubes, a carrier having means thereon for holding tubes to which end members have been applied, in predetermined positions with respect to the carrier, intermittently operating means for driving said carrier to advance the carrier and tubes in successive steps through the machine with an interval of rest between successive advancing movements, a stapling device located on one side of the carrier in position to operate on that end of each tube to which an end member has been applied, a member located on the opposite side of said carrier in position to engage the opposite end of each tube being operated upon by said device, means for moving said member into engagement with the opposite end of each tube to move the tube transversely of the carrier and toward said device, means for rotating said member and the tube engaged thereby in successive steps about the longitudinal axis of said tube, means coordinating the operation of said carrier, device and member to cause said carrier to hold each tube momentarily in position with the opposite ends thereof adjacent said device and member and to cause said member to rotate each tube in successive steps through predetermined arcs while the tube is so held by the carrier and to cause said device to operate on the tube between successive steps in the rotation of said tube by said member.

8. A machine for operating on tubes comprising a carrier having means thereon for holding tubes with their longitudinal axis parallel and substantially horizontal, a support for said carrier, devices for operating on said tubes mounted independently of the carrier and adjacent the opposite sides thereof and means for raising and lowering said carrier support to simultaneously and similarly vary the radial distance between the longitudinal axes of the tubes and each of the devices and thereby permit operation of said devices on tubes of different diameters.

9. In a machine for securing end members to tubes, a frame having a plurality of devices mounted thereon, carrier means mounted on said frame and having elements thereon for supporting one end of each tube in position to be operated on by said devices, a second frame having a plurality of members mounted thereon, carrier means mounted on said second frame and having elements thereon for holding the opposite ends of said tubes in position to be engaged by said members, tracks extending transversely between said frames and fixedly positioned with respect to said first of said frames, said second frame being movably mounted on said tracks and means on said second frame for moving said second frame along said tracks toward and away from said first frame to space said carrier means so that the elements thereon will receive and support the ends of tubes of different length.

10. Mechanism for securing end members to tubes comprising a conveyor having means thereon for supporting tubes with their axes parallel, an end member applying device and a tape applying device located adjacent one side of said conveyor for applying an end member to one end of each tube and for wrapping tape about said end of the tube, members located adjacent the opposite side of said conveyor and in alignment with each of said devices to engage the opposite ends of tubes positioned adjacent said devices, means for actuating said members to engage and move each tube with respect to said conveyor and with respect to said devices, intermittently operating drive means for moving said conveyor and the tubes carried thereby in successive steps past said devices and members with an interval of rest between said steps, and means coordinating the operation of said devices, said members and said drive means to actuate said devices and members during each of said intervals of rest.

11. Mechanism for applying end members to tubes comprising a conveyor having means thereon for supporting tubes with their axes parallel, an end member applying device and a stapling device located adjacent one side of said conveyor for applying an end member to each tube and for stapling the end members in place on the tubes, members located adjacent the opposite side of said conveyor and in alignment with each of said devices to engage the opposite ends of tubes positioned adjacent said devices, intermittently operating drive means for moving said conveyor and the tubes carried thereby in successive steps past said devices and members with an interval of rest between said steps, and means for actuating said members during said interval of rest to move the tube adjacent thereto with respect to said device and with respect to said device.

12. A machine for applying tape to tubes comprising a carrier having means thereon for supporting tubes with their axes parallel, means for moving said carrier and the tubes carried thereby in a direction transverse to the axes of the tubes, a source of tape located adjacent said carrier and in position to apply tape to each of said tubes, means for pressing tape from said source against said tubes, means for severing the tape between the tubes to which it is attached, and means located adjacent said carrier for rotating the tubes between which the tape is severed, in opposite directions about the longitudinal axes thereof and while supported on said carrier to cause the ends of the tape to be pressed onto the tube.

13. Mechanism for applying tape to tubes comprising a source of tape, means for pressing tape from said source against a tube, means for rotating said tube in one direction about its axis to cause the end of the tape to be pressed against the tube, and means to rotate the tube in the opposite direction about its axis to wrap the tape about the tube.

14. Mechanism for applying tape to tubes comprising a source of tape, means for pressing tape from said source against a tube, means for rotating said tube in one direction about its axis to cause the end of the tape to be pressed against the tube, means to rotate the tube in the opposite direction about its axis to wrap the tape about the tube, means for severing the tape between said tube and said source, and means for further rotating said tube in the latter direction to cause the severed end of the tape to be pressed against the tube.

15. Mechanism for applying tape to a tube comprising a source of tape, means for securing tape from said source to said tube, means for severing said tape at points spaced from said tube, means for rotating said tube in one direction about the axis thereof to cause one end of said tape to be secured to the tube, and means for rotating said tube in the opposite direction about its axis to cause the other end of said tape to be secured thereto.

16. Mechanism for applying tape to a tube comprising a source of tape, means for pressing tape from said source against a tube, means for severing said tape on opposite sides of the point of attachment thereof to the tube, and means for successively rotating said tube in opposite directions about the axis thereof to press first one severed end and then the other severed end of the tape against the tube.

17. Mechanism for applying tape to tubes comprising a conveyor having means thereon for holding tubes with their axes parallel, intermittently operating drive means for moving said conveyor and the tubes carried thereby in successive steps from one position to another, a tape applying device embodying a source of tape and located adjacent the conveyor and extending from one position to which the tubes are moved by the conveyor to another position, means on said device for pressing tape against a tube while in the first position, means for rotating a tube in one direction about the axis thereof and while in said first position to press one end of the tape against the tube whereby subsequent movement of the tube by said conveyor to a second position will draw tape from said source, means for severing the tape extending to said tube from said source after movement of the tube to said second position, and means for rotating said tube in the opposite direction about its axis while in said second position and after severing of said tape to wrap the tape about the tube and secure the severed end thereof of the tube.

18. Mechanism for securing end members to tubes comprising a conveyor having means thereon for holding tubes in position thereon with their axes parallel, a stapling device having an anvil projecting toward said conveyor and located adjacent one side of said conveyor for driving staples into end members carried by said tubes, intermittently operating drive means for said conveyor operable to move each tube in turn into position adjacent said stapling device and to hold said tube momentarily in said position, means for moving said each tube transversely of said conveyor and toward said device and onto said anvil, and means for moving said tube transversely of the conveyor and away from said stapling device and off said anvil after operation of said device.

19. Mechanism for securing end members to tubes comprising a conveyor having means thereon for supporting tubes with their axes parallel, a stapling device located adjacent one side of said conveyor in position to drive staples into end members carried by said tubes, intermittently operating drive means for said conveyor operable to move each tube in turn into position adjacent said stapling device and to hold said tube momentarily in said position, and means for rotating said device about the axis thereof between successive operations of said device to space the staples about said tube.

20. The method of applying tape to tubes which comprises the steps of passing tubes with their axes parallel past a source of tape, pressing the tape against the tubes to secure the tape thereto, severing the tape between tubes to which it is secured, and rotating the tubes between which the tape is severed in opposite directions about the axes thereof to press the severed ends of the tape against the tubes.

21. The method of applying tape to tubes which comprises the steps of passing tubes with their axes parallel past a source of tape, pressing the tape against one tube to secure the tape thereto, moving the tube to which the tape is secured so as to draw tape from said source, moving a second tube into engagement with the tape drawn from said source, severing the tape between said tubes, rotating the first tube about its axis in a direction to cause the severed end of the tape to be pressed against the tube, rotating the second tube about its axis in the opposite direction to cause the other severed end of the tape to be pressed against the second tube and then reversely rotating said second tube to wrap the tape about the same.

22. The method of applying tape to tubes which comprises the steps of passing tubes with their axes parallel past a source of tape, pressing the tape against one tube to secure the tape thereto, moving the tube to which the tape is secured so as to draw tape from said source, moving a second tube into engagement with the tape drawn from said source, severing the tape between said tubes, rotating the first tube about its axis in a direction to cause the severed end of the tape to be pressed against the tube, rotating the second tube about its axis in the opposite direction to cause the other severed end of the tape to be pressed against the the second tube and then reversely rotating said second tube to wrap the tape about the same, and thereafter moving said second tube so as to draw additional tape from said source.

23. The method of applying tape to a tube which comprises the steps of passing a tube into contact with tape at a point spaced from one end of the tape, pressing the tape against the tube, rotating the tube about the axis thereof in a direction to cause said end of the tape to be pressed against the tube, rotating the tube in the opposite direction about its axis to wrap the tape about the tube, and pressing the opposite end of the tape against the tube.

ROBERT R. FREDERICK.
ADOLPH W. AWOT.